INVENTORS
WILLIAM B. BELL
HOWARD E. CORNER
ROBERT L. WILLIAMS

ATTORNEY

INVENTORS
WILLIAM B. BELL
HOWARD E. CORNER
ROBERT L. WILLIAMS

ATTORNEY

United States Patent Office 3,275,061
Patented Sept. 27, 1966

3,275,061
FUEL FEEDING SYSTEMS
Robert L. Williams, Howard E. Corner, and William B. Bell, Wichita, Kans., assignors to The Boeing Company, Seattle, Wash., a corporation of Delaware
Filed Jan. 2, 1964, Ser. No. 335,261
3 Claims. (Cl. 158—36.4)

This invention relates to fuel feeding systems, and more particularly relates to fuel feeding systems for aircraft.

Conventional aircraft fuel systems have heretofore utilized one or more electrical transfer pumps for transferring fuel between tanks and/or hydraulic transfer pumps for also transferring fuel between tanks. Moreover, electrical boost pumps of the centrifugal type are used to supply fuel to aircraft engine driven fuel pump means. An engine driven fuel pump usually has two stages, the first stage being of a centrifugal or positive displacement gear type and the second stage being of a positive displacement gear type. The tank-mounted electrical boost pump is required to maintain positive pressure in the engine driven pump inlet during all flight conditions of the aircraft and for all fuel flow requirements.

A centrifugal pump, such as is usually used as a tank-mounted fuel boost pump, is characterized by high impeller tip speeds. High impeller tip speeds cause localized areas of low static pressure which can become so low as to permit the vaporization of a liquid, such as jet fuel. This vaporization phase causes fluctuations in pump performance which in turn reduces fuel output pressure. This condition worsens with an increase in fuel temperature and/or altitude. This phenomenon is usually termed cavitation. If pump cavitation is to be prevented, tank pressurization must be provided, or alternatively additional power must be provided to drive a larger pump with lower impeller speeds.

Most large or high performance aircraft presently use centrfugal pumping systems for engine fuel feed and transfer purposes. A principal type of centrifugal pumping system employs electrical motor driven pumps powered with electricity from a constant speed alternator. Other systems utilize hydraulic pumps or pneumatic driven pumps. These systems have a history of malfunction and excessive maintenance and therefore are susceptible to a reduction in mission reliability. Accordingly, aircraft utilizing these systems usually have dual pump installations. This often results in use of a combination of different types of centrifugal pumping systems, which require an excessive amount of secondary power.

This invention contemplates the use of ejector pumps in a fuel feeding system in lieu of electrical transfer pumps, hydraulic transfer pumps, and electrical boost pumps ordinarily located within the fuel tank means. Ejector pumps offer the advantages of reducing the number of moving parts in a fuel feeding system by the elimination of centrifugal boost pumps as well as electrical and hydraulic transfer pumps, and thereby provide a major improvement in the reliability of aircraft fuel feeding systems. The ejector pumps require no wiring or circuit breakers, and accordingly eliminate the usual fire hazards associated with electrical pumps which are usually located within fuel tank means. Moreover, since an ejector boost pump depends upon an engine driven pump for operation and the engine also depends upon the engine driven pump for operation, there is no necessity for an auxiliary electrical system for driving electrical pumps from an external power supply. This lends simplicity and reliability to the invention.

Ejector pumps do not have moving parts nor do they have lubrication or overheat problems generally associated with electrically driven pumps, particularly of the centrifugal type, and therefore do not require the maintenance procedures associated with electrically driven or centrifugal pumps.

Normally, the fuel output of an engine driven pump is essentially constant for a given engine speed regardless of altitude. Thus at an altitude where the engine demands less fuel flow, the excess fuel from the engine driven pump is bypassed back through the engine driven pump causing wasted power in the form of heat. In a system utilizing an ejector boost pump this excess fuel is used for supplying motive flow for the ejector boost pump and therefore is not converted into wasted heat energy. However, this inherent excess power available from the engine driven pump is not utilized in a centrifugal boost pump system. The ejector system therefore is more efficient since no additional power is required for fuel boost purposes. Also the ejector system is less costly because of its simplicity and has less weight.

It is an object of this invention therefore, to provide novel aircraft fuel feeding systems and subsystems employing ejector pumps with all of the attendant advantages pointed out hereinabove through the elimination of a number of hydraulically or electrically driven boost or transfer pumps that may be of either a variable or a positive displacement type.

It is another object of this invention to provide novel aircraft fuel feeding systems or subsystems employing ejector boost pumps in combination with a fuel feeding pump that may be driven by an aircraft engine.

Another object of this invention is the provision of novel aircraft fuel feeding systems or subsystems utilizing ejector boost pumps, and/or ejector transfer pumps, operated by excess capacity of a main fuel pump that may be driven by an engine.

A still further object of this invention is the provision of novel aircraft fuel feeding systems or subsystems utilizing ejector pumps for engine fuel feeding and inter-tank transfer purposes, having many advantages over conventional pumping systems through the reduction of maintenance, secondary power requirements, or cost, and/ or by improved reliability and safety.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
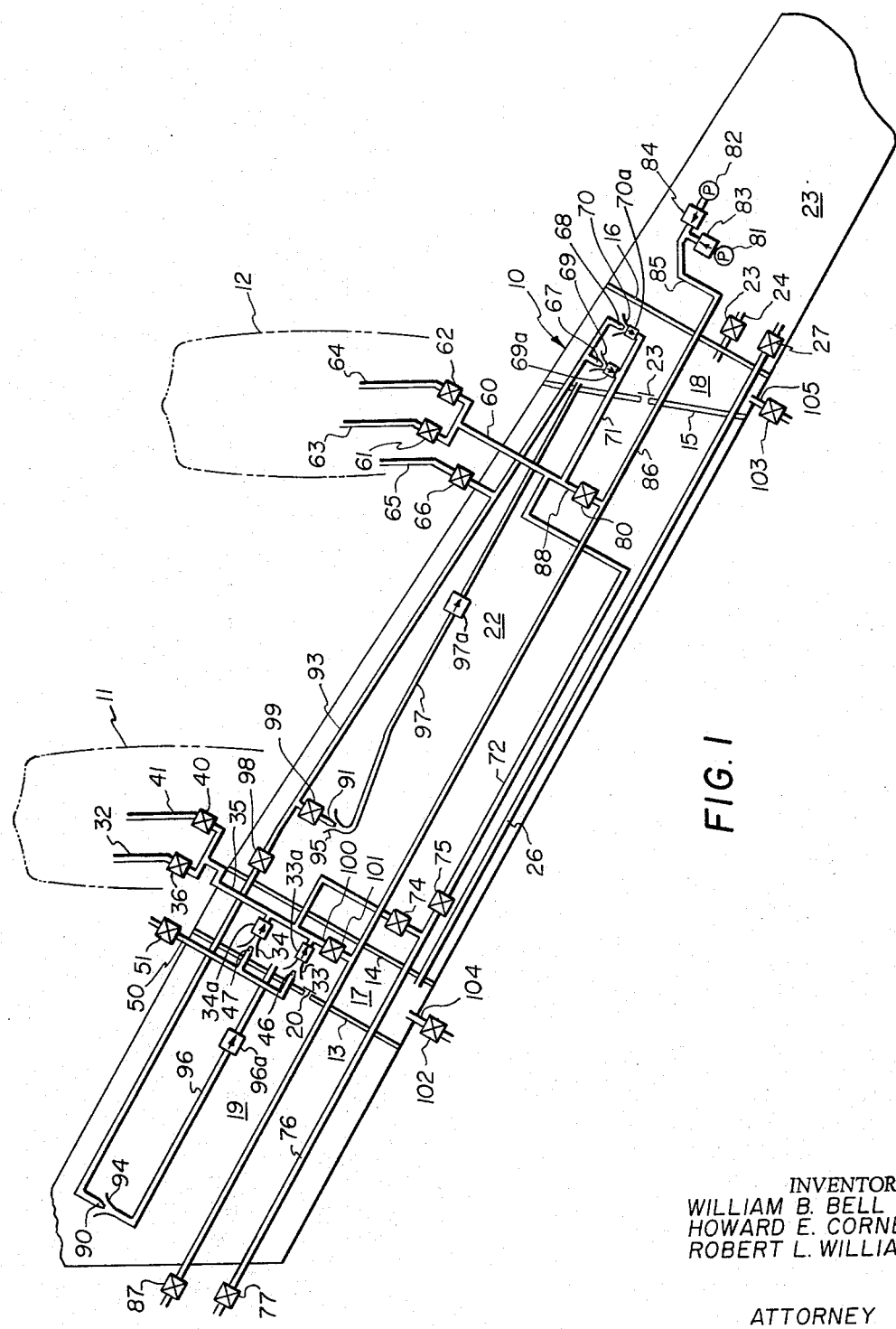
FIG. 1 is a schematic diagram of a fuel feeding system embodying the invention.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, an aircraft wing is indicated generally by the reference numeral 10. The wing 10 is a flexible wet wing that has been sealed to provide a structure that is essentially a flying fuel tank means. Preferably the wing 10 is suitable for a heavy bomber such as the B–52 having jet engine pods 11 and 12 suitably connected to the wing 10. The engine pods 11 and 12 are shown in hidden outline.

The wing 10 is compartmentalized by partitions 13 and 14, and 15 and 16, to respectively provide sump tanks 17 and 18 for jet engines housed within the pods 11 and 12. A main inboard tank 19 provides a fuel supply to the sump tank 17 by means of a flap valve 20 in the partition 13. A main outboard fuel tank 22 provides a supply of fuel to the outboard sump tank 18 by means of a flap valve 23 in the partition 15. An auxiliary tank 23 is formed in the outboard tip of the wing 10. Fuel can be transferred from the outboard auxiliary tank 23 to the sumps 17 and 18 in the following manner. A conduit 24 having a mechanically operated valve 25 therein conducts fuel from the auxiliary tank 23 into the outboard sump tank 18 through the partition 16. A fuel transfer line 26 having a mechanically operated valve 27 therein conducts fuel from the auxiliary tank 23 into the inboard sump 17 through the partitions 16, 15 and 14, respectively.

Inasmuch as the wing 10 is illustrated in FIG. 1 as a starboard wing of the B–52 aircraft and since a port wing has not been shown for purposes of simplifying the description of the invention and making the same easier to understand, it will be understood that the fuel feeding system for the port wing is substantially the same as that for the starboard wing. Thus far only natural gravity means for supplying fuel to the sump tanks 17 and 18 for the inboard and outboard pairs of engines have been described. The gravity feed system is supplemented by novel means for force-feeding fuel, for supplying fuel to the engine, and for fuel transfer purposes.

Figure 2:
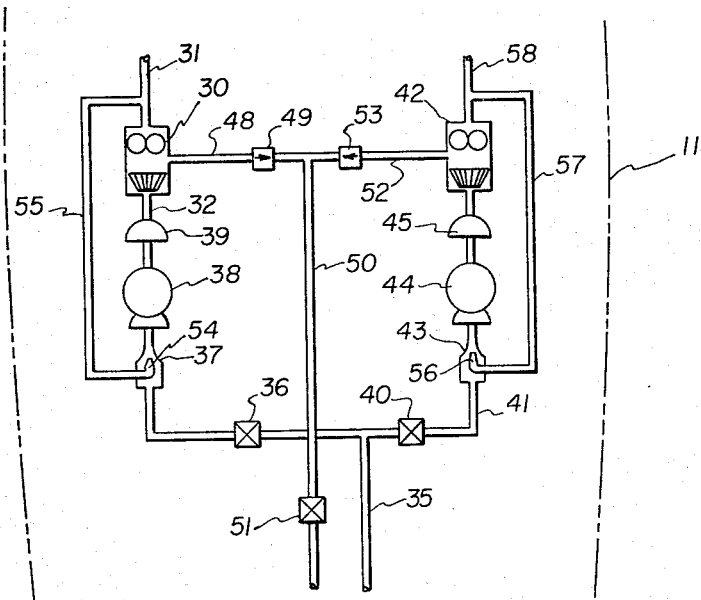
FIG. 2 is a schematic diagram of further details of the fuel feeding system of FIG. 1.

Referring to FIG. 1, each of the engine pods 11 and 12 houses two engines. However, the details of the fuel feeding system embodying the engine driven pumps are shown in FIG. 2. The subsystem of FIG. 2 is used in conjunction with each pair of the engines and therefore these subsystems for the engines in the two pods 11 and 12 are preferably identical.

Referring to FIG. 2, an engine driven pump 30 has a centrifugal first stage and a positive displacement second stage. The pump 30 is driven by the inboard engine of pod 11. The pump 30 discharges fuel through a discharge line 31 and is supplied with fuel through an intake line 32. The pump 30 draws fuel from the sump 17 by way of ejector pump eductors 33 and 34, a main fuel line 35, a mechanical shutoff valve 36, the line 32, an ejector boost pump eductor 37, a fuel heater 38, and a fuel strainer or filter 39 in the pump intake line 32. As shown in FIGS. 1 and 2, the main fuel line 35 is also used to conduct fuel to the right-hand or starboard engine in the pod 11 through a mechanical shutoff valve 40 in an intake line 41 of an outboard engine driven pump 42. The pump 42 has a centrifugal first stage and a positive displacement second stage. It is to be understood that the outboard engine in the pod 11 also has in the line 41 an auxiliary ejector boost pump eductor 43, a fuel heater 44, and a fuel strainer 45 similar to those shown in connection with the inboard engine of the pod 11.

As seen in FIGS. 1 and 2, ejector pump nozzles 46 and 47 are operatively disposed in the mouths in each of the eductors 33 and 34, respectively, so as to form ejector pumps within the sump tank 17. Fuel under pressure is supplied to the nozzles 46 and 47 from the first stage of the pump 30 by means of a boost pump feedback line 48, a one-way check valve 49 in the line 48, a main feedback line 50, and a shutoff valve 51 in the feedback line 50. The outboard pump 42 also supplies feedback fluid from the first stage thereof into the main feedback line 50 by way of a feedback line 52 having a one-way check valve 53 therein. Should either the inboard pump 30 or the outboard pump 42 be shut down there would not be any danger of any reverse flow of fluid in either the lines 48 or 52 because of the operation of the one-way check valves 49 and 53 therein, respectively. The fuel pressure in the intake line 32 upstream of the heater 38 is boosted by providing an ejector pump nozzle 54 in an operative position relative to the eductor 37. Fuel is supplied by a feedback line 55 to the nozzle 54 from the pump discharge line 31. Similarly, fuel pressure in the intake line 41 upstream of the heater 44 is boosted by providing an ejector pump nozzle 56 in an operative position relative to the eductor 43. Fuel is supplied by a feedback line 57 to the nozzle 56 from a discharge line 58 of the pump 42. Since the booster line 55 receives fuel from the second stage of the pump 30, this line 55 must be made to withstand higher pressures than the booster line 50, which receives fuel at a lower pressure from the first stage of the pump 31. By connecting the line 55 to the nearer nozzle 54, and connecting the line 50 to the further away nozzles 46 and 47 disposed in the tank 17, it is necessary to use heavier tubing only for the shorter booster line 55.

Engines in the outboard pod 12 draw fuel from a main supply line 60, FIG. 1, past shutoff valves 61 and 62 to engine driven, two stage fuel pump intake lines 63 and 64. The engines of pod 12 are not shown. A main boost pump feedback line 65 from the second stage of the engine driven pumps, not shown, of the pod 12 conducts fuel past a shutoff valve 66 to a pair of ejector pump nozzles 67 and 68 in the outboard sump tank 18. The nozzles 67 and 68 are operatively positioned within eductors 69 and 70 thereby forming ejector boost pumps in the outboard sump tank 18. The eductors 69 and 70 are connected to a common lead line 71 that discharges into the main fuel line 60. Pumps in the pods 11 and 12 can draw fuel from either the sump 17 or 18 because of an interconnecting fuel line 72 having one end connected into lead line 35 of the sump 17 and the other end connected into the lead line 60. This cross bleed of fuel between the main fuel lines 35 and 60 can take place only when shutoff valves 74 and 75 are open. By opening the shutoff valve 74 and closing the shutoff valve 75, fuel can be drawn from the port wing, not shown, by a transfer line 76 to the engines in the pod 11. Alternatively, fuel can be bled from the port wing by line 76 into engines in the pods 11 and 12 when both of the valves 74 and 75 and a shutoff valve 77 are opened. The shutoff valve 77 is in the line 76. By opening the valves 74, 75 and 77, the fluid pressure to the engine driven pumps in the main fuel lines thereof can be balanced for each of the engines on either side of the aircraft.

Fuel from the starboard auxiliary tank 23 in FIG. 1 can be supplied to engines within the pod 12 by opening a shutoff valve 80. At the time of opening the shutoff valve 80, centrifugal pumps 81 and 82 in the auxiliary tank 23 are started. The pumps 81 and 82 respectively discharge fuel past one-way check valves 83 and 84 to a common discharge line 85 in the tank 23. The line 85 is connected into an auxiliary fuel feed line 86 that extends for the length of the wing 10. By opening a shutoff valve 87 at the inboard end of the line 86, fuel can be transferred from the auxiliary tank 23 to the two inboard engines of the port wing, not shown. The main fuel line 60 of the outboard pod 12 is connected into the line 86 by means of a short interconnecting line 88 having the shutoff valve 80 therein.

The centrifugal pumps 81 and 82 have a large enough capacity to override the ejector pumps 67, 69, and 68, 70 so that the pumps 81 and 82 can force fuel into the supply line 60 from the tank 23. One-way check valves 33a, 34a, 69a, 70a, are preferably provided in the eductors 33, 34, 36 and 70, respectively, for preventing flow from the fuel lines 35 and 71 back into the sump tanks 17 and 18, especially during the operation of the pumps 81 and 82. These check valves 33a, 34a, 69a and 70a, however, can be eliminated for permitting the pumps 81 and 82 to fill the sump tanks 17 and 18, unless the pressure level may be so high as to cause damage to the sump tank ejector pumps.

In addition to the feedback line 65 supplying fuel under pressure to the nozzles 67 and 68 in the sump 18, the line 65 also supplies fluid to transfer ejector pump nozzles 90 and 91 in the main fuel tanks 19 and 22, respectively, by way of a feedback line 93. The line 93 extends substantially the length of the wing 10. Each of the nozzles 90 and 91 are respectively operatively positioned within the mouths of ejector pump eductors 94 and 95. The eductors 94 and 95 are respectively located in the main fuel tanks 19 and 22 for respectively supplying fuel to the sumps 17 and 18 by way of transfer lines 96 and 97. The lines 96 and 97 respectively extend through the partitions 13 and 15 into the sumps 17 and 18. The ejector pump 90, 94 in the tank 19 can be shut off by closing a shutoff valve 98 in the line 93. A shutoff valve 99 is connected into the line 93 adjacent to the nozzle 91 for controlling the supply of fluid from the line 93 to the nozzle 91, thereby controlling the transfer of fuel from the tank 22 into the sump 18. If desired, one-way check valves 96a and 97a can be provided, as shown in FIG 1, in the transfer lines 96 and 97, respectively, to prevent reverse fluid flow therein. However the valves 96a and 97a may be omitted, depending upon the placement of the discharge ends of the transfer lines 96 and 97 in the sump tanks 17 and 18, respectively.

In case of fire or other reasons where it may be desired to dump all the fuel from the wing 10 into the atmosphere, dump valves 102 and 103 respectively control the flow of fuel via conduits 104 and 105 from the aft ends of the sump tanks 17 and 18 of the wing 10 into the atmosphere, FIG. 1.

Figure 3:
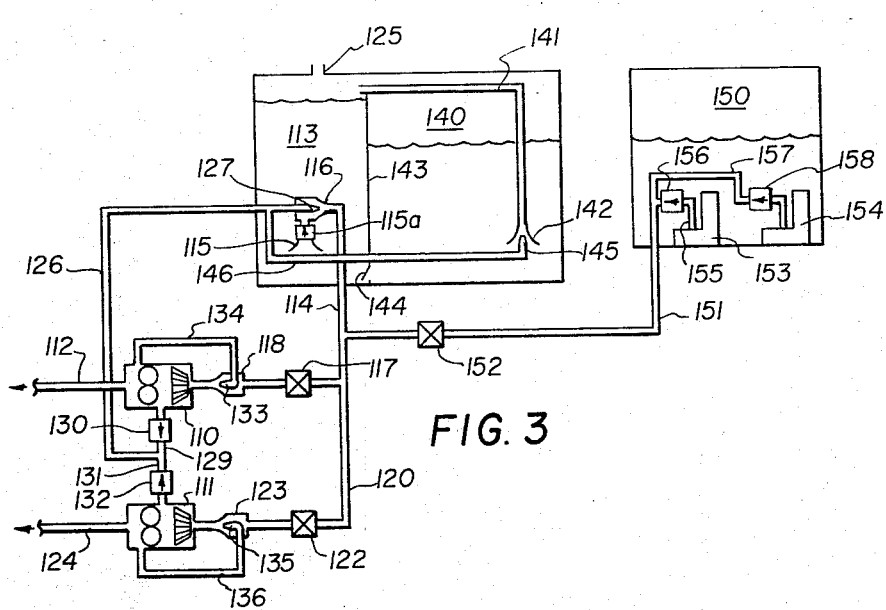
FIG. 3 is a schematic diagram of a modification of the fuel feeding system of FIGS. 1 and 2.

Referring to FIG. 3, a modification of the invention comprises a pair of two stage fuel pumps 110 and 111 each having a centrifugal first stage and a constant displacement second stage. The pump 110 discharges fuel through a discharge line 112 and draws fuel from a sump tank 113 via a main fuel line 114. The fuel line 114 has an eductor 115 on an intake end thereof and an ejector pump eductor 116, a shutoff valve 117, and another ejector pump eductor 118 between the ends thereof. The pump 111 draws fuel from the line 114 at a point between the eductor 116 and the shutoff valve 117 via a pump intake line 120. The line 120 has a shutoff valve 122 and an ejector pump eductor 123 therein, FIG. 3. The pump 111 discharges fuel to an engine by a discharge line 124. Preferably both of the pumps 110 and 111 are driven by separate jet engines housed in one of the pods 11 or 12 carried by the wing 10.

At low altitudes, atmospheric air pressure admitted to the sump tank 113 by a vent 125 forces fuel into the eductor 115 to assist the pumps 110 and 111 in drawing fuel from the sump tank 113. Excess fuel under pressure is fed back from the first stages of the pumps 110 and 111 via a common pressure boost feedback line 126 to a nozzle 127. The nozzle 127 is operatively disposed in the ejector pump eductor 116 in the sump tank 113 for assisting in supplying fuel to the pumps 110 and 111. A branch 129 of the line 126 has a one-way check valve 130 therein for preventing reverse flow of fuel therepast back into the pump 110. The branch line 129 connects the first stage of the pump 110 to the pressure boost feedback line 126. Similarly, the first stage of the pump 111 supplies excess fuel to the pressure boost feedback line 126 via a branch line 131 having a one-way check valve 132 therein. The valve 132 prevents reverse flow therepast into the pump 111 from the lines 126 and 129 through the line 131.

The fuel pressure in the line 114 to the pump 110 is boosted by providing an ejector pump nozzle 133 in the eductor 118 and supplying fuel thereto via a pressure boost feedback line 134 from the second stage of the pump 110. Similarly, the fuel pressure in the line 120 to the pump 111 is boosted by providing an ejector pump nozzle 135 in the eductor 123 and supplying fuel thereto via a pressure boost feedback line 136 from the second stage of the pump 111. The first stages of the pumps 110 and 111 may, for example, supply fuel to the second stages thereof at a pressure of 100 p.s.i.g. Fuel may, for example, be discharged from the second stage at a rated pressure of 1000 p.s.i.g. Fuel to the pumps 110 and 111 may be shut off by respectively closing valves 117 and 122, FIG. 3.

The fuel level in the sump tank 113 is kept at a maximum by providing a tank ejector pump transfer system in a main fuel tank 140. The transfer system comprises a fuel transfer line 141 having an ejector pump eductor 142 at its lower intake end and having the discharge end thereof terminating in the upper portion of the sump tank 113. A partition 143 separates the main fuel tank 140 from the sump tank 113. The partition 143 has a flap valve 144 in the bottom wall portion thereof for permitting the gravity flow of fuel only from the main fuel tank 140 into the sump tank 113.

Fuel is boosted from the tank 140 into the sump tank 113 by connecting an ejector pump nozzle 145 into the eductor 142, and supplying fuel from the pressure boost feedback line 126 to the nozzle 145 by a branch feedback line 146. The fuel transfer ejector pump 142, 145 maintains a high fuel level in the sump tank 113 relative to the fuel level in the main tank 140.

Fuel is also preferably supplied to the sump tank 113 from an auxiliary fuel tank 150 via a fuel transfer line 151 having a shutoff valve 152 therein, the main fuel line 114, the ejector pump eductor 116 and the eductor 115 in the sump tank 113.

A pair of parallelly-connected centrifugal type fuel pumps 153 and 154 supply fuel directly to the fuel pumps 110 and 111 via the lines 151, 114 and 120. The pumps 153 and 154 override the ejector pump 116, 127 in the main tank and close on one-way check valve 115a in the throat of the eductor 115 and upstream of the ejector pump eductor 116 in the sump tank 113. Preferably the fuel pressure at the nozzle 127 in the sump tank 113 is greater than the override capacity of the pumps 153 and 154. The pump 153 supplies fuel to the transfer line 151 via a discharge line 155 having a one-way check valve 156. The valve 156 prevents reverse flow in the line 155. The pump 154 supplies fuel to the transfer line 151 via a discharge line 157 having a one-way check valve 158 therein. The valve 158 prevents reverse flow in the line 157.

From the foregoing it is understood that the override system empties the auxiliary tank 150 first, and then the main fuel tank 140 is emptied next. Simultaneously therewith, the fuel level in the sump tank 113 is kept at a desired maximum level, at least until the tanks 150 and 140 are substantially empty.

Figure 4:
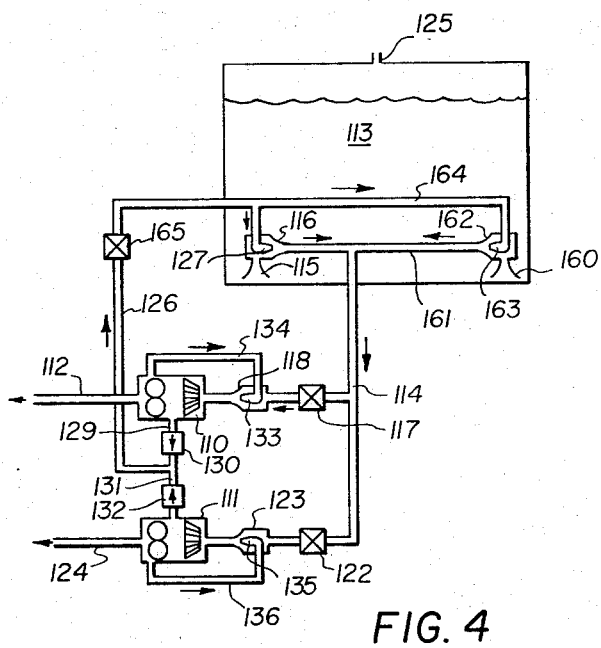
FIG. 4 is a schematic diagram of a further modification of the fuel feeding systems of FIGS. 1 and 2, and FIG. 3.

The embodiment of FIG. 4 provides a more effective means of assuring the maximum utilization of fuel available in the sump tank 113. The various elements or parts in FIG. 4 have the same reference numerals as equivalent elements or parts appearing in FIG. 3.

The improvement appearing in FIG. 4, over that disclosed in FIG. 3, comprises an additional eductor 160 connected into the main fuel line 114 via a line 161 in parallel with the eductor 115. Fuel pressure in the line 161 is boosted by the provision therein of an ejector pump comprising an eductor 162 having a nozzle 163 therein. The nozzle 163 is connected in parallel to the ejector pump nozzle 127 by a branch feedback line 164 supplied with fuel from the main pressure boost feedback line 126. Preferably a motive-flow shutoff fire valve 165 is provided in the feedback line 126. The valve 165 is closed in case of fire or other eventuality making the closing of the same desirable.

It is to be understood that this invention can be modified to adapt it to various circumstances and conditions, and it is accordingly desired to comprehend within the

We claim:
1. A fuel feeding system for an aircraft engine comprising: a fuel tank, a pump comprising a first and second stage arranged in series, first and second ejector pump means, the first of said ejector pump means being disposed in said tank and feeding through a fuel intake line to the second ejector pump means which in turn feeds into the intake of the first stage of said pump, a first pressure boost feedback line delivering from the discharge of the first stage to nozzle means of the first pump ejector means, and a second pressure boost feedback line delivering from the discharge of the second stage to nozzle means of the second ejector pump means.

2. A fuel feeding system for an aircraft engine comprising: a fuel tank, a first pump having first and second stages arranged in series and having an intake line, said first pump being located externally of said tank, said first pump intake line being connected into said fuel tank for conducting fuel therefrom and connected to said pump so as to deliver fuel to the intake of said first stage, first ejector pump means having first nozzle means and first eductor means in said first pump intake line internally of said tank, a first pressure boost feedback line connecting from the discharge of said first stage to said first ejector pump nozzle means for boosting the pressure in said first pump intake line, a transfer tank, second ejector pump means therein disposed in said transfer tank, a fuel transfer line connected at one end thereof to said second ejector pump eductor means and the other end thereof terminating in said fuel tank, a second pressure boost feedback line connected at one end thereof into said first pressure boost feedback line and at the other end thereof to said second ejector pump nozzle means, first valve means in said first pressure boost feedback line for preventing reverse flow therein, third ejector pump means having third eductor means with third nozzle means therein, said third ejector pump eductor means being connected into said first pump intake line between said first ejector pump means and said first stage, and a third pressure boost feedback line leading from the discharge of said second stage to said third nozzle means for supplying fuel under pressure to said third ejector pump nozzle means.

3. A fuel feeding system as set forth in claim 2, further comprising, a second pump having an intake line connected to said first pump intake line between said first and said third ejector pump means, a fourth pressure boost feedback line having one end connected to said second pump and another end connected into said first pressure boost feedback line downstream of said first valve means, and second valve means in said fourth pressure boost feedback line for preventing reverse flow therein back into said second pump.

References Cited by the Examiner

UNITED STATES PATENTS

| | | |
|---|---|---|
| 2,435,982 | 2/1948 | Samiran et al. |
| 2,627,812 | 2/1953 | Mann _____ 103—113 X |
| 2,660,232 | 11/1953 | Noon et al. _____ 158—36.4 |
| 2,672,880 | 3/1954 | Hermanson _____ 158—36 X |
| 2,688,925 | 9/1954 | Thoren et al. _____ 158—36.4 X |
| 2,812,715 | 11/1957 | Redding et al. |
| 2,931,381 | 4/1960 | Davies. |
| 2,953,156 | 9/1960 | Bryant. |
| 3,026,929 | 3/1962 | Burns _____ 158—36.4 |
| 3,043,104 | 7/1962 | Magnus _____ 103—5 X |

FOREIGN PATENTS

| | | |
|---|---|---|
| 382,592 | 10/1932 | Great Britain. |
| 657,083 | 9/1949 | Great Britain. |

FREDERICK KETTERER, *Primary Examiner.*